United States Patent
Gubel et al.

(10) Patent No.: US 10,247,087 B2
(45) Date of Patent: Apr. 2, 2019

(54) LIQUID TEMPERATURE SENSOR

(71) Applicant: Faraday & Future Inc., Gardena, CA (US)

(72) Inventors: Caio D. Gubel, San Clemente, CA (US); Phillip John Weicker, Pasadena, CA (US)

(73) Assignee: FARADAY & FUTURE INC., Gardena, CA (US)

( * ) Notice: Subject to any disclaimer, the term of this patent is extended or adjusted under 35 U.S.C. 154(b) by 306 days.

(21) Appl. No.: 15/131,413

(22) Filed: Apr. 18, 2016

(65) Prior Publication Data

US 2017/0298807 A1  Oct. 19, 2017

(51) Int. Cl.
| | |
|---|---|
| *H01M 10/637* | (2014.01) |
| *H01M 10/625* | (2014.01) |
| *H01M 10/6568* | (2014.01) |
| *G01K 7/22* | (2006.01) |
| *G01K 13/02* | (2006.01) |
| *F01P 11/16* | (2006.01) |
| *F01P 3/20* | (2006.01) |
| *H01C 7/00* | (2006.01) |
| *H01M 10/613* | (2014.01) |

(52) U.S. Cl.
CPC .............. *F01P 11/16* (2013.01); *F01P 3/20* (2013.01); *G01K 7/22* (2013.01); *G01K 13/02* (2013.01); *H01C 7/008* (2013.01); *H01M 10/613* (2015.04); *H01M 10/625* (2015.04); *H01M 10/637* (2015.04); *H01M 10/6568* (2015.04); *H01M 2220/20* (2013.01)

(58) Field of Classification Search
CPC .......... H01M 10/637; H01M 10/6568; H01M 2220/20; G01K 7/22; G01K 13/02; F01P 11/16; F01P 3/20; H01C 7/008
USPC ........................................... 374/185, E7.028
See application file for complete search history.

(56) References Cited

U.S. PATENT DOCUMENTS

| | | | | |
|---|---|---|---|---|
| 6,326,767 B1 * | 12/2001 | Small | ................... | H01M 2/1055 320/116 |
| 2004/0080423 A1 * | 4/2004 | Hall | ...................... | G01F 23/246 340/604 |
| 2008/0028852 A1 * | 2/2008 | Dwyer | ................... | G01F 23/247 73/295 |
| 2013/0197437 A1 * | 8/2013 | Faries | ..................... | A61M 5/44 604/113 |

(Continued)

*Primary Examiner* — Justin Seo
*Assistant Examiner* — John M Royston
(74) *Attorney, Agent, or Firm* — Knobbe Martens Olson & Bear LLP

(57) ABSTRACT

Systems and methods for monitoring the temperature of a liquid are disclosed herein. Systems can include a thermistor in contact with a liquid coolant and circuitry configured to measure a temperature of the thermistor by applying a nominal current through the thermistor and detecting a voltage drop across the thermistor. The circuitry may be further configured to apply a current pulse greater than the nominal current through the thermistor, detect a transient thermistor response to the current pulse, and compare the detected transient thermistor response to an expected transient response. The circuitry may be capable of determining if the thermistor is immersed in a fluid or at least partially located within a fluid-free region based on comparing the detected transient thermistor response to the expected transient response.

20 Claims, 6 Drawing Sheets

(56) References Cited

U.S. PATENT DOCUMENTS

2016/0186648 A1\* 6/2016 Rollinger ................ F01P 11/18
                                                        123/41.15

\* cited by examiner

LIQUID TEMPERATURE SENSOR

BACKGROUND

Field

This disclosure relates to liquid cooling systems and, more specifically, to systems and methods for monitoring coolant temperature in liquid-cooled vehicle systems.

Description of the Related Art

Motor vehicles generally rely on various liquids to operate. Such liquids may include motor lubricating oil, engine coolant, automatic transmission fluid, brake fluid, power steering fluid, windshield washer fluid, differential fluid, clutch master cylinder fluid, and liquid fuels such as gasoline, diesel, kerosene, liquefied petroleum gas, compressed natural gas, liquid hydrogen, various alcohols, biodiesel, and the like. Electric vehicles with high-voltage batteries frequently use a liquid coolant within their battery systems to avoid overheating. Many of these fluids, such as liquid coolants and motor oil, are generally kept within a desired temperature range in order to function as intended.

SUMMARY

The systems and methods of this disclosure each have several innovative aspects, no single one of which is solely responsible for its desirable attributes. Without limiting the scope as expressed by the claims that follow, its more prominent features will now be discussed briefly.

In one embodiment, a method of evaluating a thermistor status is described. The method may include applying a current pulse to a thermistor configured to measure the temperature of a fluid, detecting a transient thermistor response to the test current, and comparing the detected transient response to the an expected transient response. Detecting a transient thermistor response to the current pulse may include measuring an increase in the temperature of the thermistor due to the current pulse, and comparing the detected transient response to an expected transient response may include comparing a change in the voltage across the thermistor due to the current pulse to a predetermined threshold value. Detecting a transient thermistor response to the test current may include measuring a voltage settling time between the end of the test current and the time at which the voltage across the thermistor increases or decreases to a selected voltage, and comparing the detected transient response to an expected transient response may include comparing the voltage settling time to a predetermined threshold value. Detecting a transient thermistor response to the test current may include measuring a rate of change of the voltage across the thermistor after the end of the test current, and comparing the detected transient response to an expected transient response may include comparing the rate of change to a predetermined threshold value. The method may further comprise determining if the thermistor is immersed in the fluid based on comparing the detected transient response to the expected transient response, and/or determining if the thermistor is at least partially located within a fluid-free region based on comparing the detected transient response to the expected transient response. The thermistor may be a negative temperature coefficient (NTC) thermistor.

In another embodiment, a system for monitoring the temperature of a liquid is described. The system may comprise a thermistor in thermal contact with a liquid coolant and circuitry configured to measure a temperature of the thermistor by applying a nominal current through the thermistor and detecting a voltage drop across the thermistor. The circuitry may be further configured to apply a current pulse greater than the nominal current through the thermistor, detect a transient thermistor response to the current pulse, and compare the detected transient thermistor response to an expected transient response. Detecting a transient thermistor response to the current pulse may include measuring an increase in the temperature of the thermistor due to the current pulse, and comparing the detected transient response to an expected transient response may include comparing a change in the voltage across the thermistor due to the current pulse to a predetermined threshold value. Detecting a transient thermistor response to the test current may include measuring a voltage settling time between the end of the test current and the time at which the voltage across the thermistor increases or decreases to a selected voltage, and comparing the detected transient response to an expected transient response may include comparing the voltage settling time to a predetermined threshold value. Detecting a transient thermistor response to the test current may include measuring a rate of change of the voltage across the thermistor after the end of the test current, and comparing the detected transient response to an expected transient response may include comparing the rate of change to a predetermined threshold value. The circuitry may be further configured to determine if the thermistor is immersed in the liquid coolant based on comparing the detected transient response to the expected transient response, and/or to determine if the thermistor is at least partially located within a fluid-free region based on comparing the detected transient response to the expected transient response. The thermistor may be a negative temperature coefficient (NTC) thermistor.

The circuitry may be configured to repeatedly, at a defined interval, apply a current pulse greater than the nominal current through the thermistor, detect a transient thermistor response to the current pulse, and compare the detected transient thermistor response to an expected transient response. The circuitry may be configured to apply a current pulse greater than the nominal current through the thermistor, detect a transient thermistor response to the current pulse, and compare the detected transient thermistor response to an expected transient response, in response to an abnormal temperature measurement.

The system may comprise a plurality of thermistors in thermal contact with the liquid coolant, and the circuitry may be further configured to estimate the liquid coolant temperature based on the temperatures of at least two of the thermistors. The circuitry may be configured to estimate the liquid coolant temperature by calculating an average of the temperatures of at least two of the thermistors. The circuitry may be capable of estimating the liquid coolant temperature based on the temperatures of less than all of the thermistors. The circuitry may be configured to estimate the liquid coolant temperature based on the temperatures of only the thermistors determined to be immersed in the liquid coolant.

BRIEF DESCRIPTION OF THE DRAWINGS

The above-mentioned aspects, as well as other features, aspects, and advantages of the present technology will now be described in connection with various implementations, with reference to the accompanying drawings. The illustrated implementations are merely examples and are not intended to be limiting. Throughout the drawings, similar symbols typically identify similar components, unless context dictates otherwise. It is noted that the figures may not be drawn to any particular proportion or scale.

FIG. 1 is a circuit diagram depicting a thermistor circuit capable of temperature measurement detection of fluid-free cavities in accordance with an exemplary embodiment.

DETAILED DESCRIPTION

The following description is directed to certain implementations for the purpose of describing the innovative aspects of this disclosure. However, a person having ordinary skill in the art will readily recognize that the teachings herein can be applied in a multitude of different ways. The described implementations may be implemented in any liquid-cooled system. In some implementations, the word "battery" or "batteries" will be used to describe certain elements of the embodiments described herein. It is noted that "battery" does not necessarily refer to only a single battery cell. Rather, any element described as a "battery" or illustrated in the Figures as a single battery cell in a circuit may equally be made up of any larger number of individual battery cells and/or other elements, or may be a single module within a larger battery structure, without departing from the spirit or scope of the disclosed systems and methods.

Various batteries and/or other vehicle systems may use a liquid coolant to maintain appropriate operating temperatures. For example, one or more batteries may be enclosed by a housing and surrounded by liquid coolant. In some embodiments, coolant or cooling liquid or cooling fluid may include, for example, one or more of the following: synthetic oil, glycerin, polyolefin (e.g., poly-alpha-olefin ("PAO")), ethylene glycol, ethylene glycol and water, and phase change materials ("PCM"). In some aspects, battery cooling systems employ liquid dielectrics as the coolant. The coolant may be configured to transfer heat from the liquid coolant to the housing. The housing may include one or more heat sinks. In some embodiments, liquid may be circulated through the housing and/or through a heat exchanger.

It is generally desirable to monitor the temperature of the liquid coolant in a liquid-cooled system. Monitoring the temperature of the coolant allows the liquid-cooled system to be kept at a desired operating temperature. For example, an observed increase in the temperature of the coolant may indicate a malfunction such as a failure of a heat exchanger or circulating pump, excessive heat generation by the batteries or other liquid-cooled component, and/or a diminished quantity of coolant liquid due to a leak. Thus, temperature may be measured continuously, at defined intervals, or otherwise repeatedly to detect changes before damage occurs due to loss or overheating of coolant. Temperature may additionally be monitored at multiple locations throughout a cooled system in order to detect local anomalies and/or to determine an average temperature.

Figure 1:
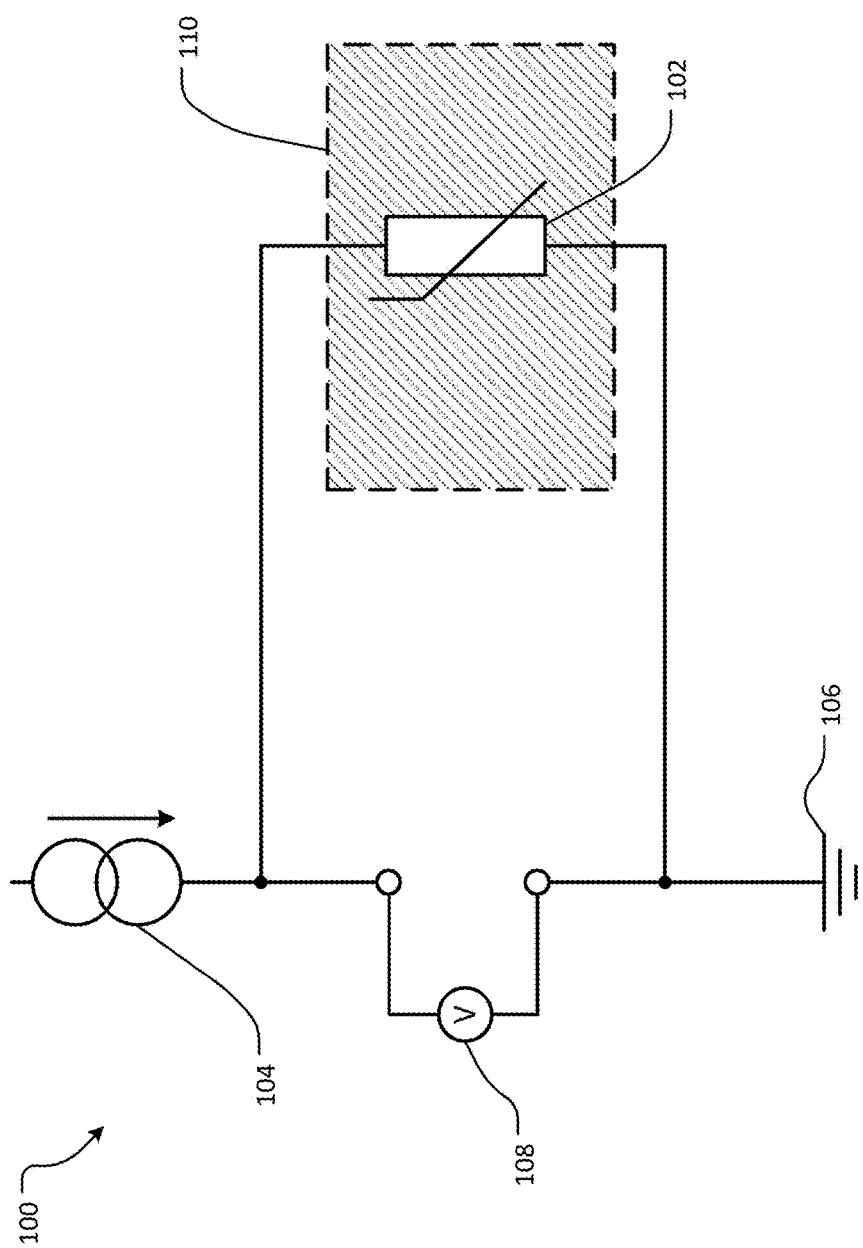

FIG. 1 is a circuit diagram depicting an example temperature circuit 100 capable of measuring a liquid temperature using a thermistor 102. The circuit 100 includes a thermistor 102 immersed in a fluid 110 and a current source 104 configured to provide a controlled current through the temperature circuit 100. Thus, current from the current source 104 may travel through the thermistor 102 to ground 106. The voltage drop across the thermistor 102 may be measured by a voltage measuring circuit 108. In some aspects, the thermistor 102 may be a negative temperature coefficient (NTC) thermistor, having a resistance that decreases with increasing temperature, or a positive temperature coefficient (PTC) thermistor, having a resistance that increases with increasing temperature.

The temperature of the fluid 110 surrounding a thermistor 102 may typically be measured by sending a small current from the current source 104 through the thermistor 102 to ground 106. A small current is used to minimize the amount of self-heating of the thermistor 102 due to resistive heating. For example, the current through the thermistor may be a current such as 10 mA, 100 mA, 500 mA, or the like. If self-heating is minimized, most or all of the heat generated by the current in the thermistor 102 may be dissipated by transfer to the surrounding fluid 110, and the thermistor 102 will remain at approximately the temperature of the fluid 110. As the current passes through the thermistor 102, the voltage measuring circuit 108 may detect the voltage drop across the thermistor 102. The resistance of the thermistor 102 may be calculated based on the known current and the measured voltage drop using the equation V=IR, where V is the measured voltage drop, I is the known current, and R is the resistance of the thermistor 102. The temperature of the thermistor 102 may then be calculated from its resistance, based on known thermal properties of the thermistor 102. For example, the resistance of the thermistor 102 may be known as a mathematical function of temperature. In some embodiments, a lookup table may contain temperature values corresponding to a variety of resistance values.

The presence of fluid-free cavities, such as gas or vacuum bubbles, in the fluid 110 surrounding the thermistor 102 may complicate the temperature measurement process described above. Fluid-free cavities may form within the fluid as a result of cavitation or by the propagation of gases present in the coolant system. Such fluid-free regions within the fluid may be carried through the system along with the surrounding fluid. In some cases, bubbles may form at nucleation sites on the surface of solid components within the liquid cooled system. Passing bubbles may further contact and adhere to solid surfaces, remaining on or adjacent to the solid surface.

If a substantial portion of the surface of a temperature measurement thermistor 102 is surrounded by gas bubbles or other fluid-free cavities, rather than coolant liquid, there may be insufficient contact between the thermistor and the coolant liquid to keep the thermistor at the temperature of the coolant liquid. For example, many fluids have thermal conductivity significantly larger than the thermal conductivity of gases such as air. For example, liquid coolants are typically selected for high thermal conductivity. A thermistor largely surrounded by a fluid-free cavity may thus retain much of the resistive heat it generates, rather than dissipating that heat into the coolant liquid, because the thermal conductivity of the fluid-free cavity is much lower than the thermal conductivity of the coolant liquid. Moreover, a thermistor largely surrounded by a fluid-free cavity may be at least partially insulated from fluctuations in the temperature of the fluid that would be detectable without the cavity.

The effects of air or other gases in the vicinity of a thermistor may be mitigated by taking measurements from a large number of thermistors disposed within the same liquid cooling system. However, adding thermistors can increase the cost and complexity of the liquid coolant monitoring system. Relying on extra thermistors may also be inaccurate, as it may be difficult to determine whether an anomalous reading from one thermistor is the result of an air pocket or a local region of warmer coolant, which may indicate a battery malfunction.

Another possible solution involves placing a small heating circuit near each thermistor. The heating circuit may be configured to send a large current through a resistor and may temporarily heat the fluid near the thermistor due to resistive heating. If the thermistor detects the increased temperature, it may be assumed to be immersed in the fluid, and its data may thus be considered reliable. If the thermistor does not detect the increased temperature, it may be assumed that the thermistor is not detecting the actual temperature of the fluid, and its data may be considered unreliable. However, the use of a heating circuit near each thermistor is also likely to add considerable cost and complexity to the liquid coolant monitoring system. For example, some electric vehicle battery packs may include 50, 100, or even several hundred thermistors for coolant temperature measurement. Thus, the use of an extra heating circuit to periodically test each thermistor is likely to be undesirably expensive.

Thus, an alternative detection method based on self-heating is described to determine the reliability of a thermistor temperature measurement without requiring additional circuitry within the liquid-cooled system. Thermistors are ordinarily used to measure temperature by applying a low current so as to avoid self-heating that may introduce an error. To detect whether a thermistor is immersed in fluid or affected by air bubbles nearby, a pulse of a larger current may be sent through the thermistor to intentionally induce self-heating. After sending a pulse of larger current, the system may revert to sending a small temperature measurement current through the thermistor. The system may then evaluate the amount of self-heating due to the current pulse and/or the rate of temperature decay as the thermistor returns to its pre-pulse temperature, as will be described in greater detail below.

Figure 2A:
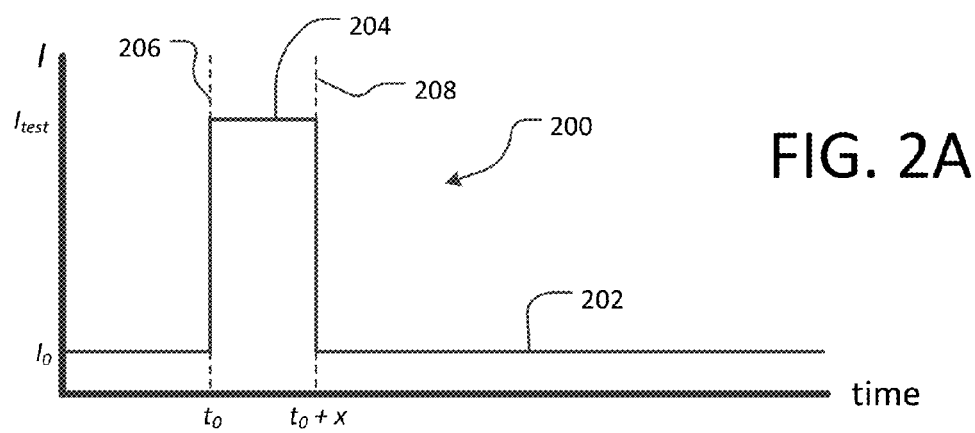
FIG. 2A is a graph depicting an example current pulse for detection of fluid-free cavities in accordance with an exemplary embodiment.

FIG. 2A is a graph depicting an example current pulse 200 that may be sent through a thermistor to determine if the thermistor is immersed in fluid. Before and after the current pulse 200 is applied, the thermistor carries a nominal current $I_0$ 202 selected to enable temperature measurement while minimizing thermistor self-heating. For example, in some embodiments the nominal current 202 may be in the range of 10 mA, 100 mA, 500 mA, or similar. At a desired testing time $t_0$ 206, the current source may increase the current to a test current $I_{test}$ 204, so as to intentionally heat up the thermistor. For example, in some embodiments, the test current 204 may be in the range of 1 A, 2 A, 5 A, 10 A, or greater. After a predetermined test pulse duration x (that is, at time $t_0$+x 208), the current source may decrease the current from the test current back to the original nominal current $I_0$ 202.

Figure 2B:
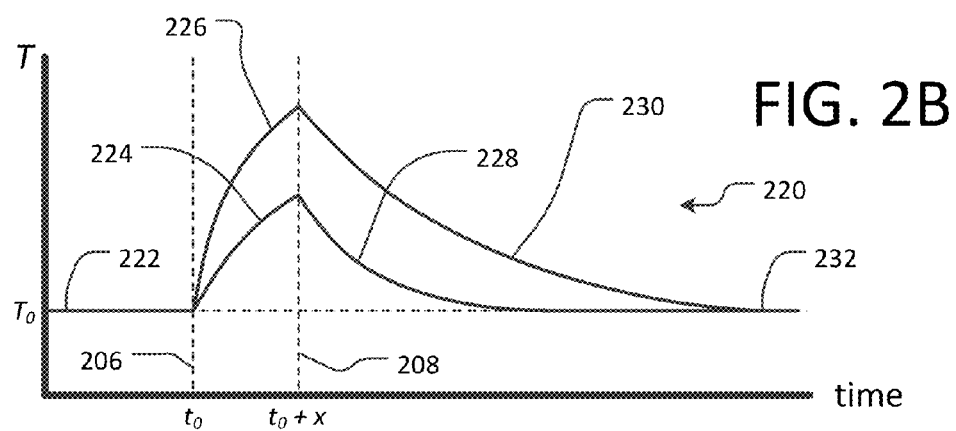
FIG. 2B is a graph depicting a thermistor temperature profile corresponding to the current pulse of FIG. 2A.

FIG. 2B is a graph depicting example temperature profiles 220 of a thermistor receiving the current pulse 200 depicted in the graph of FIG. 2A. During the time before the current pulse 200, the thermistor may be at a constant or substantially constant initial temperature $T_0$ 222. If the thermistor is immersed in a fluid as intended, the initial temperature 222 will be equal or close to the temperature of the surrounding fluid. If the thermistor is partially or totally surrounded by fluid-free cavities such as vas or vacuum, the initial temperature 222 may be higher or lower than the temperature of the surrounding fluid. However, the initial temperature 222 is likely to be substantially constant even if the thermistor is not well immersed in the fluid.

When the test current 204 is applied to the thermistor at $t_0$ 206, the temperature of the thermistor begins to increase due to self-heating. If the thermistor is immersed in fluid, it may experience a more moderate temperature increase 224 as a portion of the heat generated is quickly transferred to the fluid. If the thermistor is only partially immersed in fluid, or is entirely surrounded by a fluid-free region of gas or vacuum, the thermistor will experience a greater temperature increase 226 because a smaller portion of the heat generated will be removed, due to the lower thermal conductivity of the fluid-free cavity.

In some embodiments, processing circuitry (not shown) may compare the temperature of the thermistor at the end 208 of the current pulse 200 with expected temperature values to determine whether the thermistor is sufficiently immersed in the fluid to provide reliable measurements. For example, the temperature at time $t_0$+x 208, or the change in temperature between $t_0$ 206 and $t_0$+x 208 may be compared with a stored threshold value. If the measured temperature or temperature change does not exceed the threshold value, the processing circuitry may determine that the thermistor is sufficiently immersed in the fluid. If the measured temperature or temperature change exceeds the threshold value, the processing circuitry may determine that the thermistor is not sufficiently immersed in the fluid, and remedial steps may be taken, as described in greater detail with reference to FIG. 3.

Continuing with FIGS. 2A and 2B, the current passing through the thermistor returns to the nominal current 202 at time $t_0$+x 208. At this reduced current, the thermistor experiences significantly reduced self-heating. Thus, the thermistor will cool down gradually until it reaches an equilibrium temperature 232 equal or similar to its initial temperature $T_0$ 222. If the thermistor is immersed in fluid, it will return to approximately $T_0$ 222 fairly rapidly as the excess heat is transferred to the surrounding fluid. This quick temperature decay 228 occurs due to the higher thermal conductivity of the fluid relative to air or other gases. If the thermistor is only partially immersed in fluid, or is entirely surrounded by a region of air or other gas, the thermistor will take much longer to return to a temperature close to $T_0$ 222. This slower temperature decay 230 occurs due to the lower thermal conductivity of air or other gases relative to the coolant fluid.

In some embodiments, processing circuitry (not shown) may determine whether the thermistor is immersed in fluid based on the rate or duration of temperature decay. Temperature decay analysis may be applied either instead of or in addition to the temperature increase analysis described above. Temperature decay analysis may be accomplished by determining how long the thermistor takes after time $t_0$+x 208 to return to a temperature near the initial temperature 222, also referred to as a temperature settling time. Because the rate of temperature decay decreases as the temperature of the thermistor approaches its equilibrium temperature 232, the thermistor may take a relatively long time to reach its final equilibrium temperature 232. Thus, the processing circuitry may determine the temperature settling time when the temperature decreases below a threshold temperature (e.g., $T_0+0.5°$ C., $T_0+1°$ C., or similar), or when the rate of temperature decrease drops below a minimum rate. If the measured temperature settling time is equal to or lower than a predetermined expected settling time, the processing circuitry may determine that the thermistor is sufficiently immersed in the fluid. If the measured temperature settling time is greater than a predetermined expected settling time, the processing circuitry may determine that the thermistor is not sufficiently immersed in the fluid, and remedial steps may be taken, as described in greater detail with reference to FIG. 3. Similarly, the processing circuitry may determine that the thermistor is sufficiently immersed in the fluid if a measured temperature decay rate is greater than a predetermined threshold, or may determine that the thermistor is not sufficiently immersed in the fluid if the decay rate is less than the threshold.

Figure 2C:
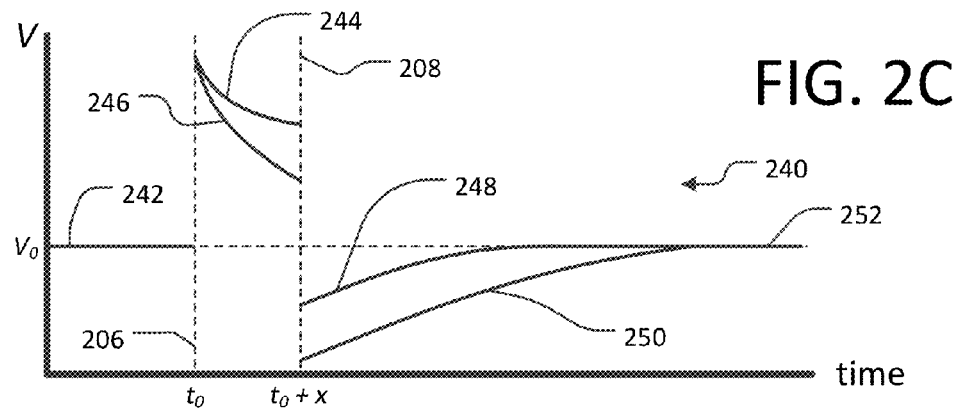
FIG. 2C is a graph depicting a thermistor voltage profile corresponding to the current pulse of FIG. 2A and the thermistor temperature profile of FIG. 2B.

FIG. 2C is a graph depicting example voltage profiles 240 of the voltage across a negative temperature coefficient (NTC) thermistor receiving the current pulse 200 depicted in the graph of FIG. 2A, consistent with the temperature profiles of FIG. 2B. The profiles 240 of FIG. 2C represent example transient voltage responses that may be observed in NTC thermistors. During the time before the current pulse 200, the voltage across the thermistor may be a constant or substantially constant initial voltage drop $V_0$ 242.

When the test current 204 is applied to the thermistor at $t_0$ 206, the voltage across the thermistor will initially increase due to the increased current and initially unchanged resistance. More specifically, the increase in voltage will be equal to $R_0(I_{test}-I_0)$, where $R_0$ is the resistance of the thermistor at time $t_0$ 206. Because the example thermistor of FIG. 2C is an NTC thermistor, the voltage across the thermistor will begin decreasing after time $t_0$ due to the current through the thermistor remaining constant while the resistance of the thermistor decreases due to the increasing temperature, as depicted in FIG. 2B. If the thermistor is immersed in fluid, it may experience a more moderate voltage decrease 244 due to the more moderate temperature increase 224 depicted in FIG. 2B. If the thermistor is only partially immersed in fluid, or is entirely surrounded by a fluid-free region of gas or vacuum, the thermistor will experience a greater voltage decrease 246 due to the greater temperature increase 226 depicted in FIG. 2B.

In some embodiments, processing circuitry (not shown) may compare the voltage across the thermistor at the end 208 of the current pulse 200 with expected voltage values to determine whether the thermistor is sufficiently immersed in the fluid to provide reliable measurements. For example, the voltage across the thermistor at time $t_0+x$ 208, or the change in voltage across the thermistor between $t_0$ 206 and $t_0+x$ 208 may be compared with a stored threshold value. If the measured change in voltage does not exceed the threshold value, the processing circuitry may determine that the thermistor is sufficiently immersed in the fluid. If the measured change in voltage exceeds the threshold value, the processing circuitry may determine that the thermistor is not sufficiently immersed in the fluid, and remedial steps may be taken, as described in greater detail with reference to FIG. 3.

Continuing with FIGS. 2A-2C, the current passing through the thermistor returns to the nominal current 202 at time $t_0+x$ 208. When the current drops to the nominal current 202, the voltage across the thermistor will similarly drop by an amount equal to $R_f(I_1-I_0)$, where $R_f$ is the final resistance of the thermistor at time $t_0+x$ 208. As described above, the thermistor will gradually cool down until it reaches an equilibrium temperature. Because the example thermistor of FIG. 2C is an NTC thermistor, the voltage across the thermistor will begin increasing after time $t_0+x$ due to the current through the thermistor remaining constant while the resistance of the thermistor increases due to the decreasing temperature, as depicted in FIG. 2B. The voltage across the thermistor will increase gradually until it reaches an equilibrium voltage 252 equal or similar to its initial voltage $V_0$ 242. If the thermistor is immersed in fluid, it will return to approximately $V_0$ 242 fairly rapidly due to the quick temperature decay 228 depicted in FIG. 2B. If the thermistor is only partially immersed in fluid, or is entirely surrounded by a region of air or other gas, the thermistor will take much longer to return to a voltage close to $V_0$ 242 due to the slower temperature decay 230 depicted in FIG. 2B.

In some embodiments, processing circuitry (not shown) may determine whether the thermistor is immersed in fluid based on the rate or duration of voltage increase after the end of the current pulse. This voltage increase analysis may be applied either instead of or in addition to the voltage decrease analysis described above. Voltage increase analysis may be accomplished by how long the thermistor takes after time $t_0+x$ 208 to return to a voltage near the initial voltage 242 across the resistor, also referred to as a voltage settling time. Because the rate of voltage increase decreases as the voltage approaches its equilibrium voltage 252, the thermistor may take a relatively long time to reach its final equilibrium voltage 252. Thus, the processing circuitry may determine the voltage settling time when the voltage increases above a threshold voltage (e.g., $T_0+100$ mV, $T_0+1V$, or similar), or when the rate of voltage increase drops below a minimum rate. If the measured voltage settling time is equal to or lower than a predetermined expected settling time, the processing circuitry may determine that the thermistor is sufficiently immersed in the fluid. If the measured voltage settling time is greater than a predetermined expected settling time, the processing circuitry may determine that the thermistor is not sufficiently immersed in the fluid, and remedial steps may be taken, as described in greater detail with reference to FIG. 3. Similarly, the processing circuitry may determine that the thermistor is sufficiently immersed in the fluid if a measured voltage increase rate is greater than a predetermined threshold, or may determine that the thermistor is not sufficiently immersed in the fluid if the increase rate is less than the threshold.

Thus, a thermistor may be tested using the processes described above to determine if the thermistor is sufficiently immersed in the fluid and providing reliable fluid temperature measurements, or if the thermistor's fluid temperature measurements are unreliable due to fluid-free cavities in the surrounding area. All threshold and/or expected values described above may be predetermined experimentally for an individual thermistor, for a temperature measurement system including multiple thermistors, and/or based on experimentally determined values for similar thermistor temperature measurement systems. The testing process described above may be carried out routinely during operation of the cooling system, for example, every minute, every 5 minutes, every 10 minutes, or at any other desired interval. The testing process may also be carried out in response to an irregular temperature reading generated by the thermistor, either in addition to or instead of routine testing, so as to determine whether the irregular reading from the thermistor indicates a fluid overheating condition or an erroneous measurement. Similar testing processes may be used with both NTC thermistors and positive temperature coefficient (PTC) thermistors.

Figure 2D:
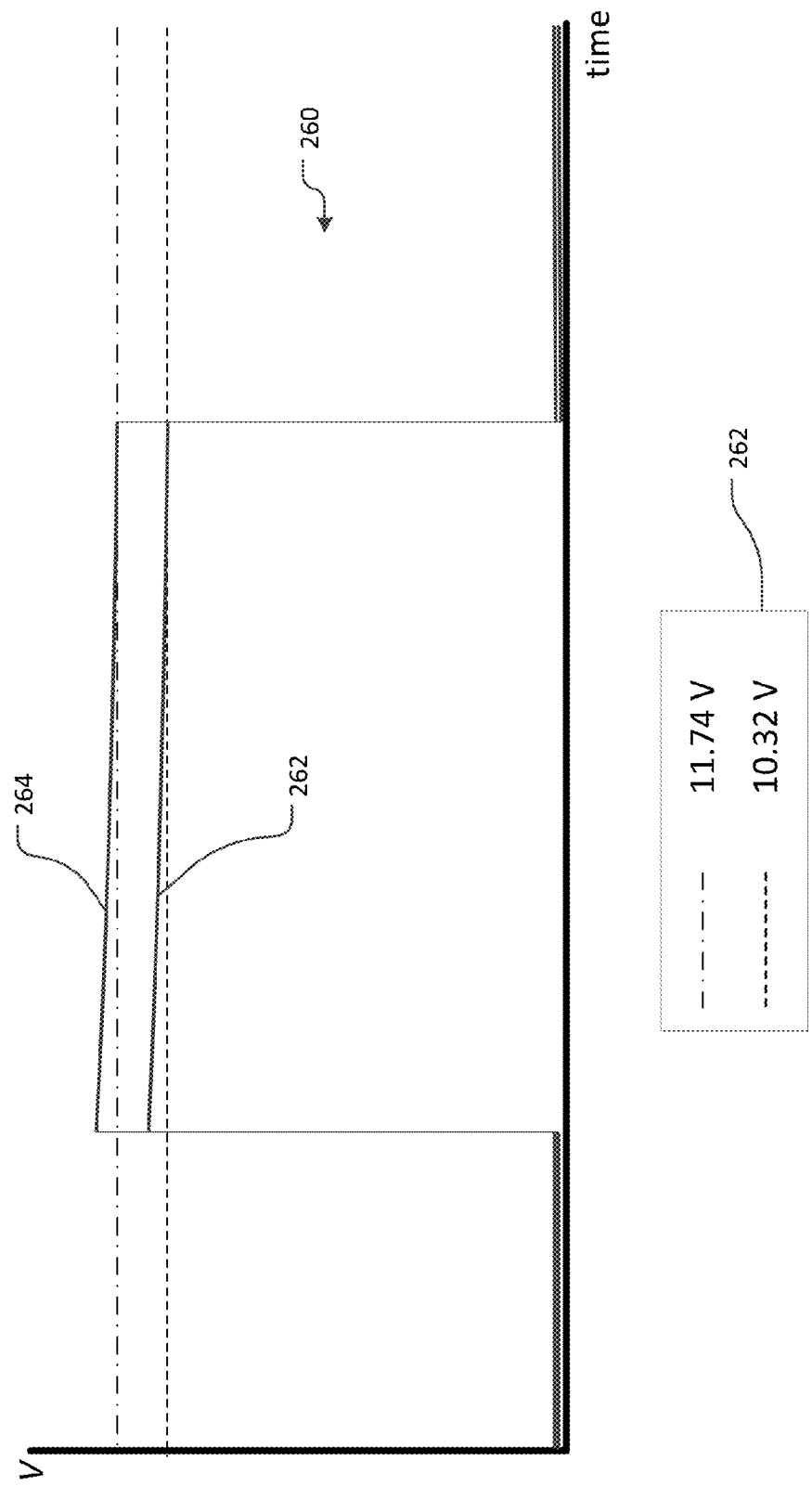
FIG. 2D is a graph depicting two experimental thermistor voltage profiles.

To demonstrate the transient temperature and voltage responses described herein, a current pulse was applied to an experimental configuration of two thermistor circuits. The experimental configuration included a first thermistor immersed in fluid and a second thermistor not immersed in fluid. FIG. 2D is a graph depicting two voltage profiles 260 obtained by applying the current pulse to the two thermistors. The first temperature profile 262 corresponds to the thermistor immersed in fluid, and the second temperature profile 264 corresponds to the thermistor not immersed in fluid. Each thermistor was exposed to a current pulse similar to the pulse depicted in FIG. 2A, and the voltage across the thermistor was measured. During the pulse, the voltage across the non-immersed thermistor 264 was consistently higher than the voltage across the immersed thermistor 262. The recorded voltage data 262 for the two thermistors at the end of the pulse indicates that in the experimental configuration, there was a difference in voltage of approximately 12% between the immersed thermistor and the non-immersed thermistor.

Figure 3:
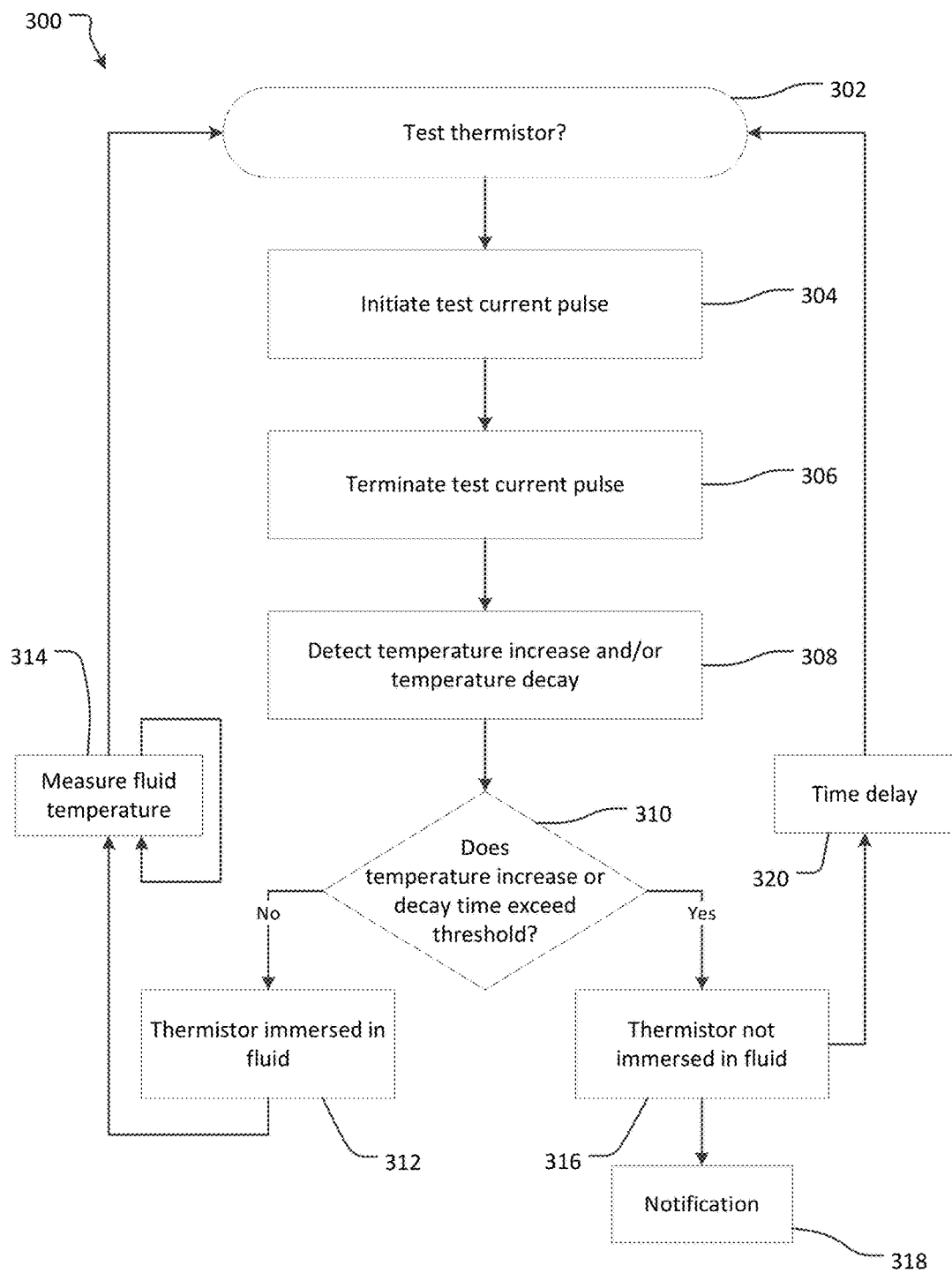
FIG. 3 is a flow chart depicting a fluid-free cavity detection method in accordance with an exemplary embodiment.

FIG. 3 depicts an example process 300 for detecting when thermistor temperature data is unreliable due to fluid-free cavities in the vicinity of the thermistor. The process 300 may be performed, for example, using the systems described elsewhere herein. The process 300 may also be performed simultaneously and/or consecutively for a plurality of thermistors in a liquid cooling system. In some embodiments, the steps of the process 300 may be carried out by cooling system monitoring circuitry, which may be located within the cooling system, near the cooling system, or elsewhere. For example, where the liquid cooling system is provided for maintaining a battery or battery pack at a desired temperature, the monitoring circuitry may be combined with other battery monitoring and control circuitry.

The process may begin at block 302, where it is determined to test a thermistor. In some embodiments, thermistor testing may be performed at a predetermined and recurring time interval. In such embodiments, thermistor testing may occur automatically each time the predetermined time interval elapses. In some embodiments, thermistor testing may be performed in response to receiving an abnormal temperature indication from a thermistor. In those embodiments, the processing circuitry may be configured to determine that a thermistor reliability verification is necessary any time an abnormal temperature indication is received, or after a predetermined number of consecutive abnormal temperature indications are received from a single thermistor. When it is determined that a thermistor test is necessary, the process continues to block 304.

At block 304, the process may initiate a test current pulse in the thermistor so as to increase the temperature of the thermistor by resistive self-heating. For example, the current pulse may be the pulse described above with reference to FIG. 2A. The current pulse may be a pulse of a predetermined magnitude and duration. The current pulse may be provided by the same current source that provides a nominal current during ordinary thermistor temperature measurement operation, or the current pulse may be provided by a separate current source configured to deliver a higher current. After the predetermined test current pulse duration elapses, the process continues to block 306, where the process terminates the current pulse. When the current pulse is terminated, the current traveling through the thermistor decreases to the nominal pre-pulse current, as described above with reference to FIG. 2A. After the current pulse is terminated, the process 300 continues to block 308.

At block 308, the process detects a temperature increase and/or a temperature decay. As described above with reference to FIG. 2B, the process may detect the presence or absence of fluid surrounding the thermistor by detecting either or both of the amount of temperature increase due to the current pulse, and the time or rate of temperature decrease following the current pulse. To detect the increase in temperature due to the current pulse, the processing circuitry may store the last recorded temperature measurement before the initiation of the current pulse and the first recorded temperature value after the current pulse is terminated. The circuitry may then compare the two temperature values to determine the amount of temperature increase. The circuitry may detect a time and/or rate of temperature decay as described above with reference to FIG. 2B. After determining a temperature increase, rate of temperature decay, and/or time of temperature decay, the process 300 continues to decision state 310.

At decision state 310, the process 300 determines if the temperature increase, temperature decay rate, and/or temperature decay time exceeds a predetermined threshold. The predetermined thresholds may be determined experimentally as described elsewhere herein. If the amount of temperature increase or the time required for the temperature to return to normal is smaller than the predetermined threshold value, the process 300 may continue to block 312, where it determines that the thermistor is immersed in fluid. If the thermistor is immersed in fluid, its temperature is most likely to be the same or close to the temperature of the surrounding fluid. Thus, the temperature data from the thermistor may be deemed reliable, and the process may continue to block 314, where the system continues to measure temperature data using the thermistor. Fluid temperature measurements may be taken repeatedly at the thermistor. If one or more abnormal temperatures are measured and/or a predetermined verification time interval elapses, the verification process 300 may repeat by returning to block 302.

If the process 300 instead determines at decision state 310 that the temperature increase or the time required for the temperature to return to normal is greater than the predetermined threshold value, the process may continue to block 316, where it determines that the thermistor is not sufficiently immersed in fluid to produce reliable temperature measurements. In some embodiments, the process 300 may continue to a notification block 318. At notification block 318, a user, technician, or other recipient may be notified that the fluid temperature measurement system is not functioning properly. In vehicle battery or motor cooling systems, the notification block 318 may include a dashboard warning light, video screen notification, or other notification to the operator. In some embodiments, a notification may be sent only upon repeated indications that a thermistor is not immersed in fluid. In some coolant system embodiments with multiple thermistors, a notification may be sent only upon detecting that a predetermined number or fraction of the thermistors are not immersed in fluid.

When the process 300 determines that a thermistor is not immersed in fluid, it may return to block 302 to repeat the verification process 300, either immediately or after a time delay 320. A time delay 320 may be incorporated so as to allow the thermistor to become immersed in fluid again. For example, after a time delay of 5 seconds, 10 seconds, up to several minutes or more, the thermistor may again be immersed in fluid and may be capable of providing reliable temperature measurements. For example, re-immersion may occur due to variation in the flow of coolant fluid through the system, air bubbles attached to the thermistor becoming dislodged, or other changes. In some embodiments, the verification process 300 may be repeated until decision state 310 results in a determination that the thermistor is immersed in fluid. In embodiments including multiple thermistors in the coolant system, coolant temperature may be estimated by monitoring circuitry based on temperature data from only the thermistors determined to be sufficiently immersed in the fluid, thus excluding likely erroneous temperature data from the estimation.

Figure 4:
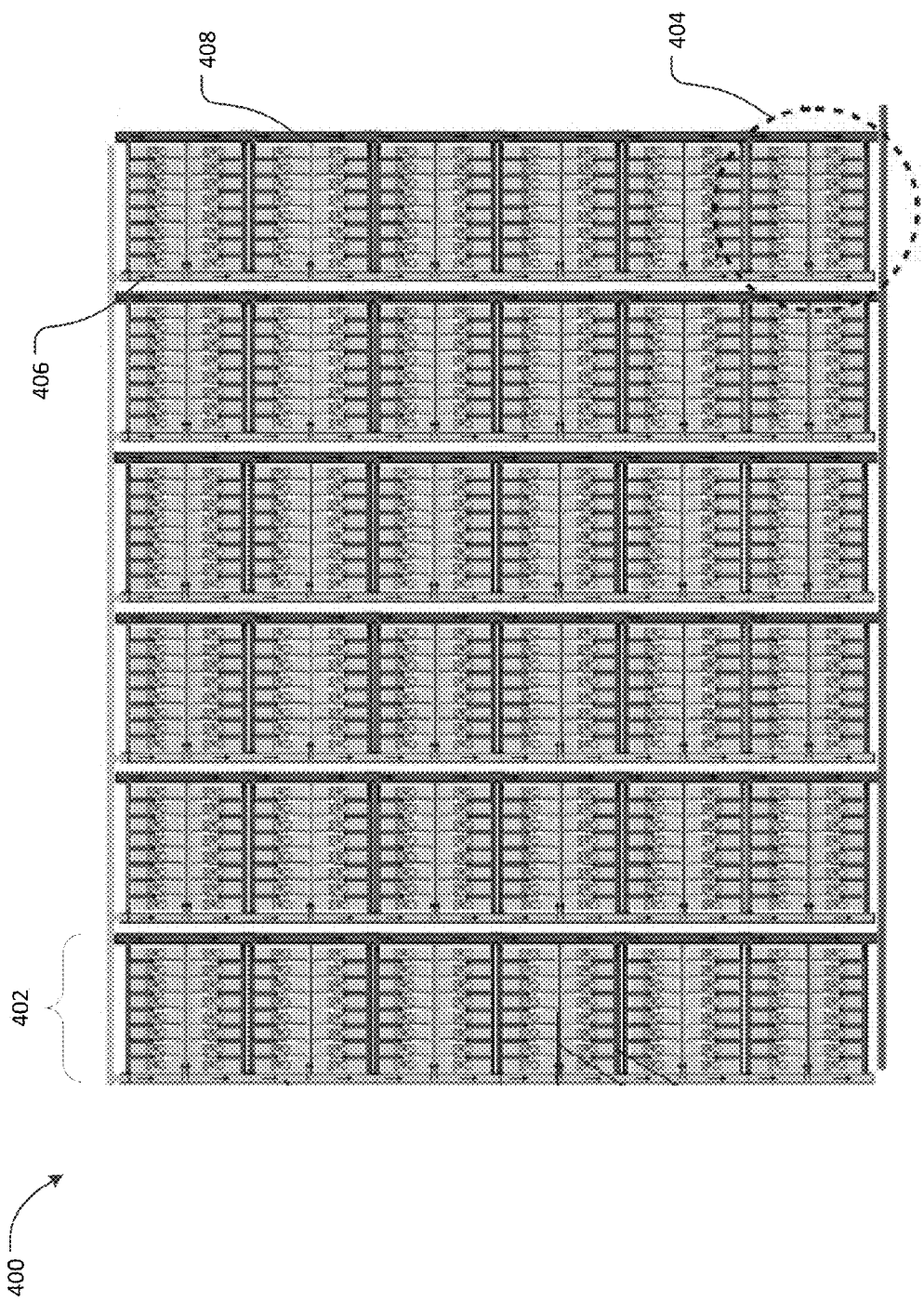
FIG. 4 is a simplified diagram depicting a chassis of an electric vehicle incorporating thermistor temperature monitoring and fluid-free cavity detection in accordance with an exemplary embodiment.

FIG. 4 is a diagram depicting multiple battery strings 402 within an electric vehicle battery pack 400 in accordance with an exemplary embodiment. In some embodiments, multiple batteries may be packaged in a module 404, with multiple modules 404 combined to form a battery pack 400. The individual batteries or battery modules 4094 may be arranged in strings 402. A battery or battery module 404 may include one or more electrochemical cells. The batteries may comprise any type of battery suitable for electric vehicle propulsion, such as lithium-ion batteries, nickel metal hydride batteries, lead acid batteries, or the like. In some embodiments, battery pack 400 may be a high voltage battery pack configured to power an electric vehicle powertrain. In some embodiments, battery pack 400 may be a low voltage (e.g., 12V) battery pack configured to power various electric vehicle systems.

A battery string 402 may be formed by connecting two or more battery modules 404 in series. Multiple strings 402 may be combined in parallel to create larger battery pack 400. Connecting multiple strings 402 in parallel allows for additional energy storage without increasing the voltage of the battery pack 400. For example, the battery pack 400 depicted in FIG. 4 may comprise six strings 402 of identical voltage and energy storage capacity, so that the energy storage capacity of the entire battery pack 400 is equal to six times the storage capacity of an individual string 402, while the voltage of the entire battery pack 400 is equal to the voltage of each individual string 402. The use of battery strings 402 allows for the addition of more strings 402 to add extra energy storage capacity to the battery pack 400 without affecting the voltage produced.

In embodiments combining multiple battery modules 404, liquid cooling may be performed in the same manner as described elsewhere herein. In some embodiments, a single cooling system, including a coolant reservoir, pump, and heat exchanger, may be used to provide chilled coolant to multiple battery modules 404, multiple strings 402, or even an entire battery pack 400. Conduits 406 and 408 may be provided throughout the battery pack 500 to transport coolant between battery modules 504, strings 502, and the cooling system. In some embodiments, an intake conduit 406 may deliver chilled coolant from the cooling system to the battery modules 404, and a return conduit 408 may collect and return warmed coolant from the battery modules 404 to the cooling system.

Thermistors may be employed with a multi-battery pack 400 in the same manner as described elsewhere herein. In some embodiments, a plurality of thermistors for temperature monitoring may be provided within each battery module 404 or within a pack 400. Where a plurality of battery modules share a quantity of liquid coolant, data from the thermistors in the plurality of battery modules may be combined so as to increase the accuracy of coolant temperature monitoring while also allowing for detection of localized anomalies which may indicate a malfunction of a single cell, brick, or module. For example, where multiple batteries 404 are arranged in series in parallel strings 402 with a common source of liquid coolant, the temperature data from all thermistors may be combined for each string 402, or even for the battery pack 400 as a whole, rather than carrying out a separate temperature analysis for each battery module 404. Temperature data from multiple thermistors may be combined using any suitable method. For example, in some embodiments simultaneous temperature measurements from multiple thermistors may be summed and then divided by the number of measurements to generate an average temperature of the coolant. If any of the plurality of thermistors are determined to be located in a fluid-free region, rather than immersed in the liquid, such as by the method described above with reference to FIG. 3, the temperature data from the non-immersed thermistors may be excluded from the combined average.

Figure 5:
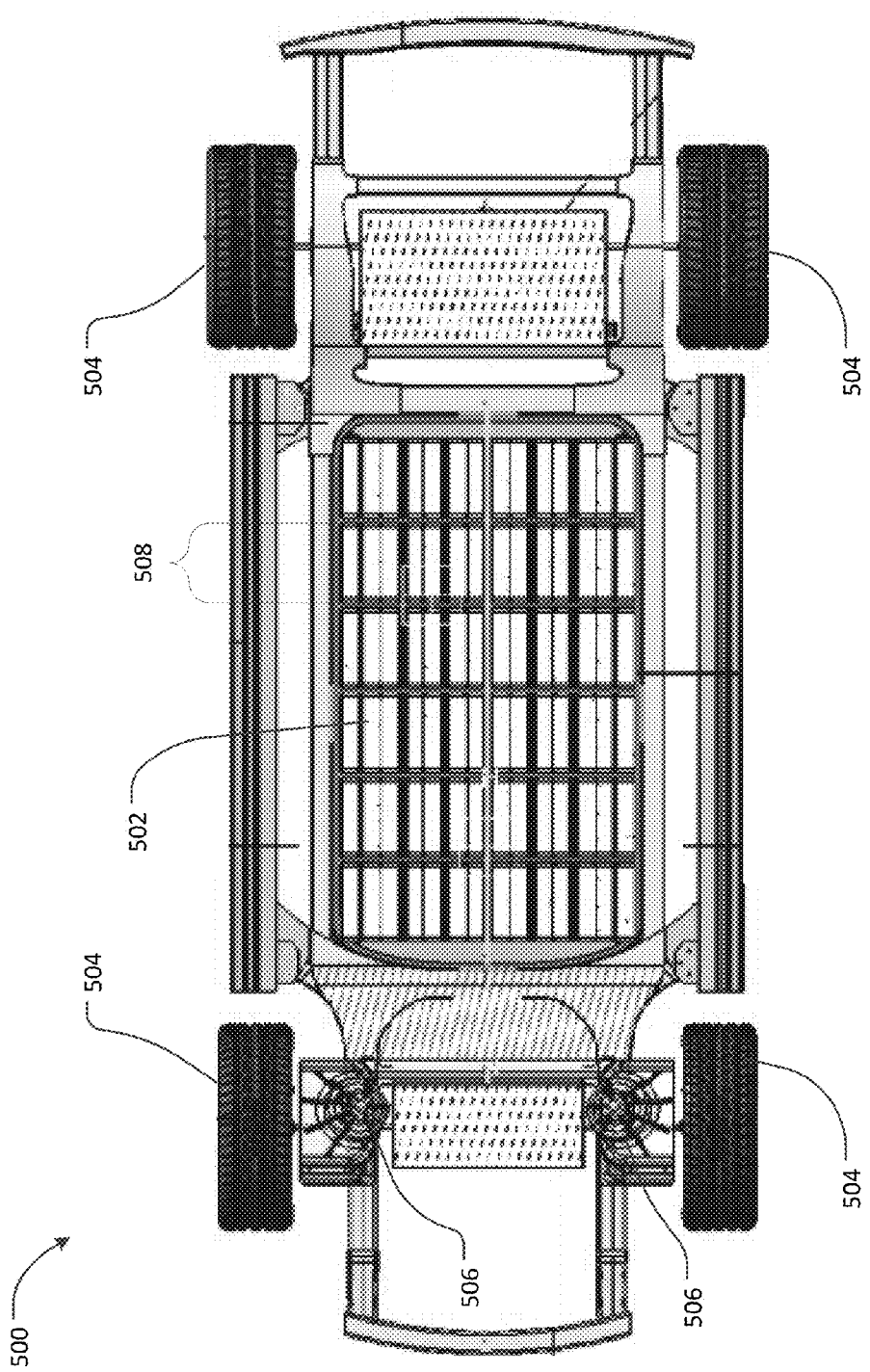
FIG. 5 is a simplified diagram depicting multiple battery strings within an electric vehicle in accordance with an exemplary embodiment.

FIG. 5 is a diagram depicting a chassis of an electric vehicle 500 incorporating thermistor temperature measurement in accordance with an exemplary embodiment. An electric vehicle 500 may include a powertrain comprising a battery pack 502, a plurality of wheels 504 and at least one electric traction motor 506 configured to turn the wheels 504 and propel the vehicle 500. The battery pack 502 may be configured to provide electric power to the traction motors 506. In some embodiments, the battery pack 502 may include multiple battery strings 508. Strings 508 may be individually switchable so that some strings 508 may be active and provide power while other strings 508 are disconnected from the rest of the vehicle. Individually switchable strings may improve performance and reliability, for example, by allowing the vehicle 500 to continue driving after a failure or fault detection in one or more strings 508, as the faulty string(s) may be disconnected while the remaining strings continue providing power.

Thermistor temperature monitoring and air bubble detection as described above with reference to FIGS. 1-4 may provide a similar benefit if used in each battery string 508. If a cooling system failure occurs in any of the strings 508, the failure may be detected as an increased temperature at one or more thermistors. The faulty string 508 may be disconnected such that current stops flowing through that string 508, and the string 508 may be protected from any further damage from overheating. However, inaccurate thermistor temperature data due to cavitation may cause the detection of false failures as described above, resulting in unnecessary battery string disconnection and reduced vehicle performance. The cavitation detection methods described elsewhere herein can decrease the occurrence of false cooling failure detection by selecting only reliable temperature measurement data.

Additional details and embodiments relating to the use of liquid cooled batteries in electric vehicles are described in U.S. application Ser. No. 14/841,617, titled "Vehicle Energy-Storage System" and filed on Aug. 31, 2015, and U.S. application Ser. No. 15/050,269, titled "Temperature Dependent Fuse for Battery Cooling System" and filed on Mar. 3, 2016, both of which are incorporated by reference herein in their entirety.

The foregoing description details certain embodiments of the systems, devices, and methods disclosed herein. It will be appreciated, however, that no matter how detailed the foregoing appears in text, the devices and methods can be practiced in many ways. As is also stated above, it should be noted that the use of particular terminology when describing certain features or aspects of the invention should not be taken to imply that the terminology is being re-defined herein to be restricted to including any specific characteristics of the features or aspects of the technology with which that terminology is associated. The scope of the disclosure should therefore be construed in accordance with the appended claims and any equivalents thereof.

With respect to the use of any plural and/or singular terms herein, those having skill in the art can translate from the plural to the singular and/or from the singular to the plural as is appropriate to the context and/or application. The various singular/plural permutations may be expressly set forth herein for sake of clarity.

It is noted that the examples may be described as a process. Although the operations may be described as a sequential process, many of the operations can be performed in parallel, or concurrently, and the process can be repeated. In addition, the order of the operations may be rearranged. A process is terminated when its operations are completed. A process may correspond to a method, a function, a procedure, a subroutine, a subprogram, etc.

The previous description of the disclosed implementations is provided to enable any person skilled in the art to make or use the present disclosed process and system. Various modifications to these implementations will be readily apparent to those skilled in the art, and the generic principles defined herein may be applied to other implementations without departing from the spirit or scope of the disclosed process and system. Thus, the present disclosed process and system is not intended to be limited to the implementations shown herein but is to be accorded the widest scope consistent with the principles and novel features disclosed herein.

What is claimed is:

1. A method of evaluating a thermistor status, the method comprising:
    applying a current pulse to a thermistor positioned to measure the temperature of a fluid;
    detecting a transient thermistor response to the current pulse; and
    comparing the detected transient response to an expected transient response,
    wherein detecting the transient thermistor response comprises measuring at least one of a temperature settling time and a voltage settling time, and
    wherein comparing the detected transient thermistor response to the expected transient response comprises comparing the measured settling time to a predetermined threshold settling time.

2. The method of claim 1, wherein detecting a transient thermistor response to the current pulse comprises measuring an increase in the temperature of the thermistor due to the current pulse, and wherein comparing the detected transient response to an expected transient response comprises comparing a change in the voltage across the thermistor due to the current pulse to a predetermined threshold value.

3. The method of claim 1, wherein detecting a transient thermistor response to the test current comprises measuring a voltage settling time between the end of the test current and the time at which the voltage across the thermistor increases or decreases to a selected voltage, and wherein comparing the detected transient response to an expected transient response comprises comparing the voltage settling time to a predetermined threshold value.

4. The method of claim 1, wherein detecting a transient thermistor response to the test current comprises measuring a rate of change of the voltage across the thermistor after the end of the test current, and wherein comparing the detected transient response to an expected transient response comprises comparing the rate of change to a predetermined threshold value.

5. The method of claim 1, further comprising determining if the thermistor is immersed in the fluid based on comparing the detected transient response to the expected transient response.

6. The method of claim 1, further comprising determining if the thermistor is at least partially located within a fluid-free region based on comparing the detected transient response to the expected transient response.

7. The method of claim 1, wherein the thermistor is a negative temperature coefficient (NTC) thermistor.

8. A system for monitoring the temperature of a liquid, the system comprising:
    a thermistor in thermal contact with a liquid coolant; and
    circuitry configured to measure a temperature of the thermistor by applying a nominal current through the thermistor and detecting a voltage drop across the thermistor;
    wherein the circuitry is further configured to apply a current pulse greater than the nominal current through the thermistor, detect a transient thermistor response to the current pulse, and compare the detected transient thermistor response to an expected transient response,
    wherein detecting the transient thermistor response to the current pulse comprises measuring at least one of a temperature settling time and a voltage settling time, and
    wherein comparing the detected transient thermistor response to the expected transient response comprises comparing the measured settling time to a predetermined threshold settling time.

9. The system of claim 8, wherein detecting a transient thermistor response to the test current comprises measuring an increase in the temperature of the thermistor due to the current pulse, and wherein comparing the detected transient response to an expected transient response comprises comparing a change in the voltage across the thermistor due to the current pulse to a predetermined threshold value.

10. The system of claim 8, wherein detecting a transient thermistor response to the test current comprises measuring a voltage settling time between the end of the test current and the time at which the voltage across the thermistor increases or decreases to a selected voltage, and wherein comparing the detected transient response to an expected transient response comprises comparing the voltage settling time to a predetermined threshold value.

11. The system of claim 8, wherein detecting a transient thermistor response to the test current comprises measuring a rate of change of the voltage across the thermistor after the end of the test current, and wherein comparing the detected transient response to an expected transient response comprises comparing the rate of change to a predetermined threshold value.

12. The system of claim 8, wherein the circuitry is further configured to determine if the thermistor is immersed in the liquid coolant based on comparing the detected transient response to the expected transient response.

13. The system of claim 8, wherein the circuitry is further configured to determine if the thermistor is at least partially located within a fluid-free region based on comparing the detected transient response to the expected transient response.

14. The system of claim 8, wherein the thermistor is a negative temperature coefficient (NTC) thermistor.

15. The system of claim 8, wherein the circuitry is configured to repeatedly, at a defined interval, apply a current pulse greater than the nominal current through the thermistor, detect a transient thermistor response to the current pulse, and compare the detected transient thermistor response to an expected transient response.

16. The system of claim 8, wherein the circuitry is configured to apply a current pulse greater than the nominal current through the thermistor, detect a transient thermistor response to the current pulse, and compare the detected transient thermistor response to an expected transient response, in response to an abnormal temperature measurement.

17. The system of claim 12, wherein the system comprises a plurality of thermistors in thermal contact with the liquid coolant, and wherein the circuitry is further configured to estimate the liquid coolant temperature based on the temperatures of at least two of the thermistors.

18. The system of claim 17, wherein the circuitry is configured to estimate the liquid coolant temperature by calculating an average of the temperatures of at least two of the thermistors.

19. The system of claim 17, wherein the circuitry is capable of estimating the liquid coolant temperature based on the temperatures of less than all of the thermistors.

20. The system of claim 19, wherein the circuitry is configured to estimate the liquid coolant temperature by:
  combining temperature data from the plurality of thermistors;
  identifying one or more of the plurality of thermistors as non-immersed thermistors;
  determining a reduced set of temperature data by excluding temperature data of the non-immersed thermistors; and
  calculating an average based on the reduced set of temperature data.

* * * * *